UNITED STATES PATENT OFFICE.

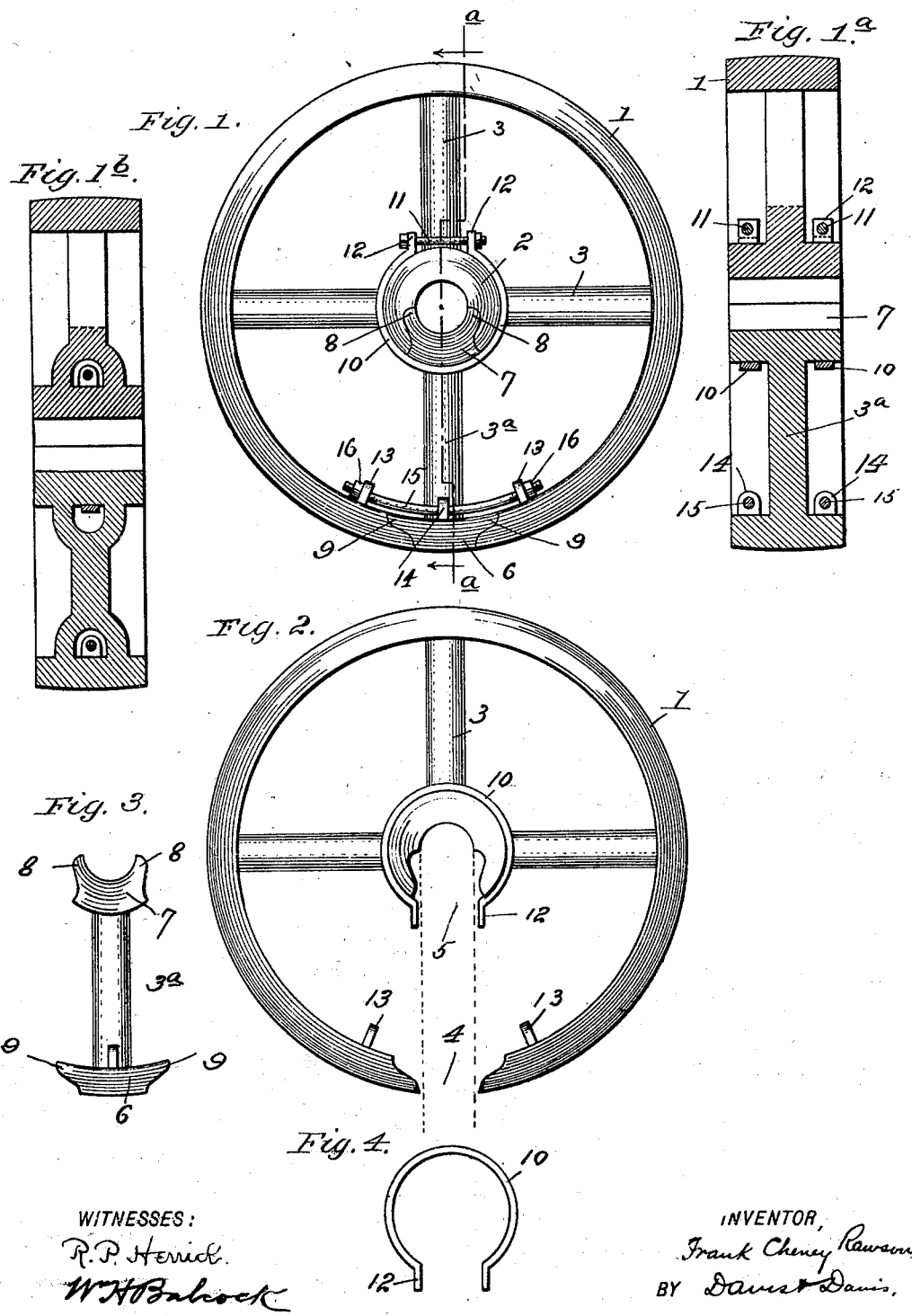

FRANK CHENEY RAWSON, OF WORCESTER, MASSACHUSETTS.

SPLIT PULLEY.

SPECIFICATION forming part of Letters Patent No. 671,031, dated April 2, 1901.

Application filed November 8, 1900. Serial No. 35,819. (No model.)

*To all whom it may concern:*

Be it known that I, FRANK CHENEY RAWSON, a citizen of the United States, residing at Worcester, county of Worcester, State of Massachusetts, have invented certain new and useful Improvements in Split Pulleys, of which the following is a specification, reference being had therein to the accompanying drawings, in which—

Figure 1 is side elevation of the pulley assembled; Fig. 1$^a$, a vertical sectional view on line $a\,a$ of Fig. 1; Fig. 1$^b$, a similar view showing a slight variation in the manner of arranging the means for fastening in place the removable section of the pulley; Fig. 2, a side elevation of the pulley, the removable section being detached; Fig. 3, a detail side elevation of the removable section, and Fig. 4 a detail view of the hub-clamping ring.

The object of the invention is to provide a split pulley having the main portion of its rim and the corresponding portion of its hub or box formed integral with or rigidly fastened to the spokes, a small passage being left through the rim and hub to permit the wheel to be placed over a shaft. A small portion of the rim and a corresponding portion of the hub are connected together rigidly by one spoke and so formed that when in place the passage through the rim and hub will be closed accurately, means being provided to rigidly hold this removable section in place.

Referring to the various parts by numerals, 1 designates the main portion of the pulley-rim, 2 the main portion of the hub or box, and 3 the spokes, which are formed integral with the main portions of the rim and hub or are fastened rigidly and permanently thereto, as may be desired. A small opening 4 is left between the ends of the main portion of the pulley-rim, and a corresponding opening 5 is left in the hub in radial alinement with the opening in the rim, these openings being only large enough to permit the passage of the shaft into the center of the hub.

The removable section 6 of the rim closes the opening between the ends of the main portion of the rim, and the removable section 7 of the hub closes the opening in the hub, these removable sections being rigidly secured to the outer and inner ends, respectively, of the spoke 3$^a$. The inner end of the portion 7 of the hub is enlarged laterally at 8, and the walls of the opening 5 are correspondingly shaped, so that in order to insert said portion 7 in the opening 5 it must be slid therein sidewise along the shaft. When it is in position, it cannot be radially moved either inward or outward. The portion 6 of the rim is an inwardly-enlarging wedge, it being enlarged laterally at 9, so that the inner surface thereof is longer than its outer surface, and the end walls of this section are inclined, the corresponding walls of the abutting ends of the rim being correspondingly shaped, so that when this removable section is in place it cannot be displaced radially and the ends of the main portion of the rim cannot be forced inward.

To bind the removable section of the hub in place and prevent it vibrating or moving sidewise along the shaft, a split clamping band or ring 10 is placed on the hub, a space being left between its ends sufficient to permit it to pass over the shaft. The ends of this band are turned outward to form ears 12, which are perforated for the passage of the clamping-bolt 11. Two of these split clamping-rings may be employed, if desired, one on each end of the hub, the spokes being between them, as shown in Fig. 1$^a$, or only one may be employed, as shown in Fig. 1$^b$. In this latter case the inner ends of the spokes may be arched and the split ring placed around the hub through the arches, as shown.

After the pulley has been placed over the shaft and the removable section is in position the split clamping-ring is slid around the hub until the ears 12 are diametrically opposite the opening 5 in the hub, and then the clamping-bolt 11 is inserted and the clamping-nut screwed up.

To rigidly secure the removable section 6 of the rim from vibration and sidewise movement, and also to prevent the ends of the main portion of the rim from spreading or being moved laterally, inward-extending perforated lugs 13 are formed on the inner surface of the main portion of the rim, one at each end thereof, and a similar lug 14 is formed on the corresponding surface of the removable section 6, at the center thereof, all of said lugs being directly in line with one another. A long clamping-bolt 15 is passed through these lugs, and nuts 16 are screwed on its ends and against the lugs 13. Two sets of these lugs and bolts may be employed, as shown in Fig. 1ª, or one set of lugs and one bolt may be employed, as shown in Fig. 1ᵇ. In this latter case the outer end of the spoke 3ª will be arched, as shown, for the passage of the bolt, said bolt being concentric with the pulley.

The pulley may be formed of either wood or metal, as desired, and the removable section will be formed to accurately fit the openings in the main section, so that when assembled there will be no room for play between the parts, and insuring a perfectly cylindrical shaft-opening, it being impossible to get the two sections of the hub off center.

It will be observed that the removable hub-section entirely fills the opening in the hub and is curved to fit directly against the shaft, not only that a perfectly cylindrical opening will at all times be assured, but that adjusting devices, which are liable to derangement and inaccuracy, are obviated. It is also obvious that with this arrangement the removable section may be easily and quickly placed in proper position by resting the curved end of the hub-section against the shaft and sliding it directly into place.

Having thus fully described my invention, what I claim is—

1. The combination of a main rim-section and a main hub-section connected together by spokes, radially-alined openings being formed in both sections, said openings both enlarging laterally, a removable hub-section enlarging laterally and fitting the opening in the main hub-section, a removable rim-section enlarging laterally and fitting within the opening in the main rim-section, a spoke connecting the two removable sections, and means for fastening the removable sections in place.

2. The combination of a main rim-section and a connected main hub-section, removable connected hub and rim sections, means connecting the rim-sections consisting of alined inward-extending ears on both the sections and a bolt engaging the ears and extending entirely across the removable section, substantially as set forth.

3. The combination, of a main rim-section and a main hub-section rigidly connected together by spokes, openings being left between the ends of the main rim-section and the ends of the main hub-section, said openings being radially in line, a removable hub-section adapted to close the opening between the ends of the main hub-section, a removable rim-section adapted to close the opening between the ends of the main rim-section, said removable rim-section being an inwardly-enlarging wedge, the ends of the main rim-section abutting against the inclined end walls thereof, a rigid spoke connecting the two removable sections, and means for clamping the removable sections in place.

4. The combination of a main split-rim section, a main split-hub section, spokes connecting these sections, a closing-section for the split hub, a closing-section for the split rim, a spoke connecting these two closing-sections, a split clamping-ring mounted on the hub and adapted to rotate thereon to bring its opening to register with the opening therein, and a clamping-bolt adapted to engage the ends of the main split-rim section and the removable rim-section and securely hold them together.

5. The combination of connected main hub and rim sections having radially-alined openings, the opening in the hub being enlarged laterally, connected removable rim and hub sections, the latter enlarging laterally inward and fitting the opening in the hub-section and curved at its inner end to fit against the shaft.

In testimony whereof I hereunto affix my signature, in the presence of two witnesses, this 6th day of November, 1900.

FRANK CHENEY RAWSON.

Witnesses:
 JOSEPH K. GREENE,
 J. E. HUTCHINS.